Dec. 2, 1969  W. S. FIEDLER ET AL  3,481,389
METHOD OF MELTING AND CASTING FOAM METAL
Original Filed May 8, 1961  7 Sheets-Sheet 1

INVENTOR.
WILLIAM S. FIEDLER
ROBERT P ANNEN
BY
ATTORNEY

INVENTOR.
WILLIAM S. FIEDLER
ROBERT P. ANNEN
BY
ATTORNEY

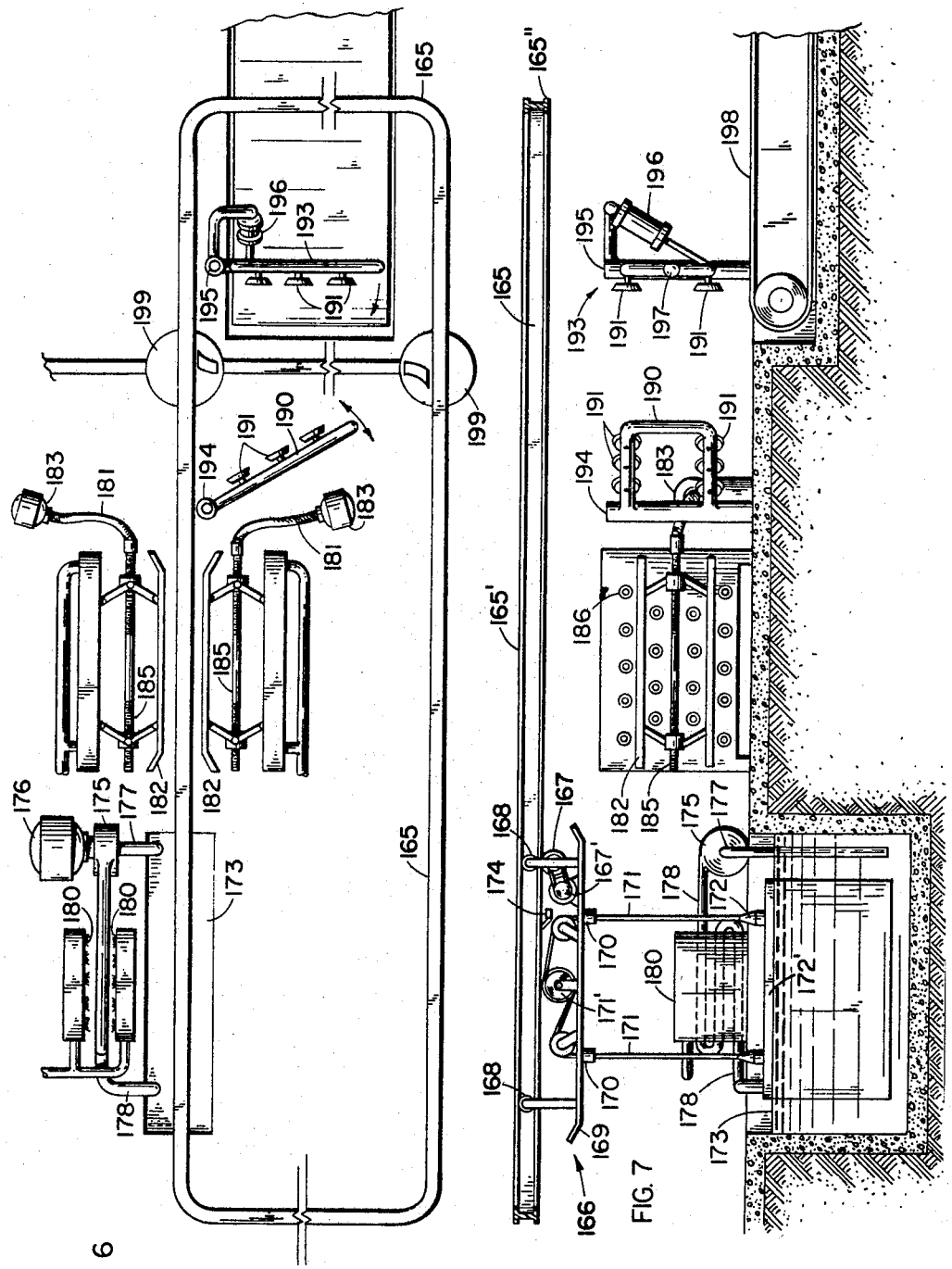

INVENTOR.
WILLIAM S. FIEDLER
ROBERT P. ANNEN
BY
ATTORNEY

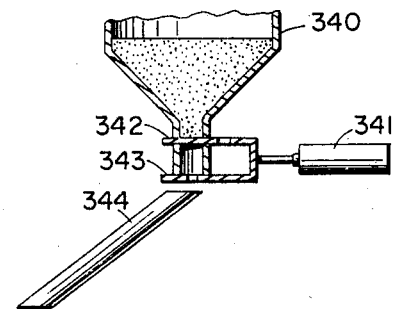
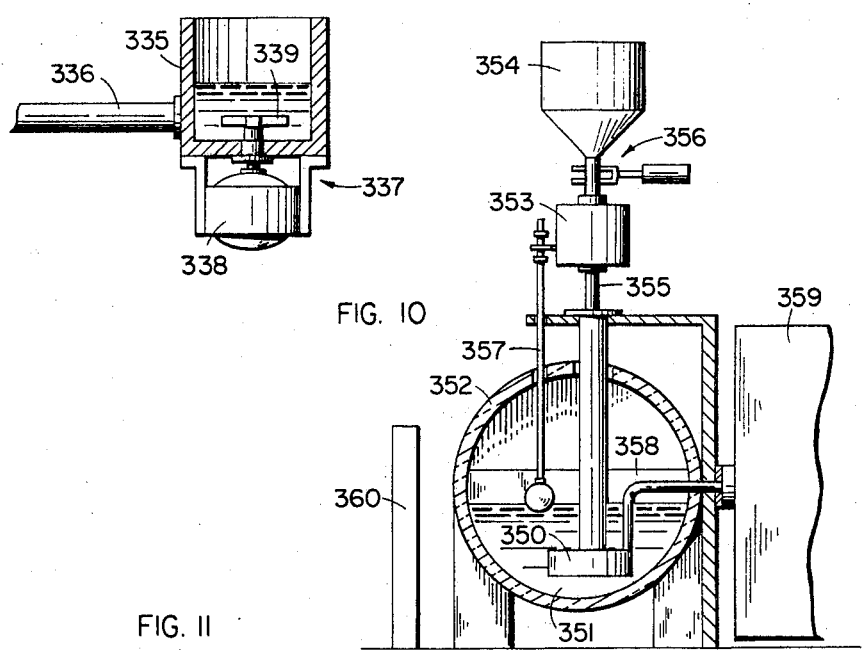
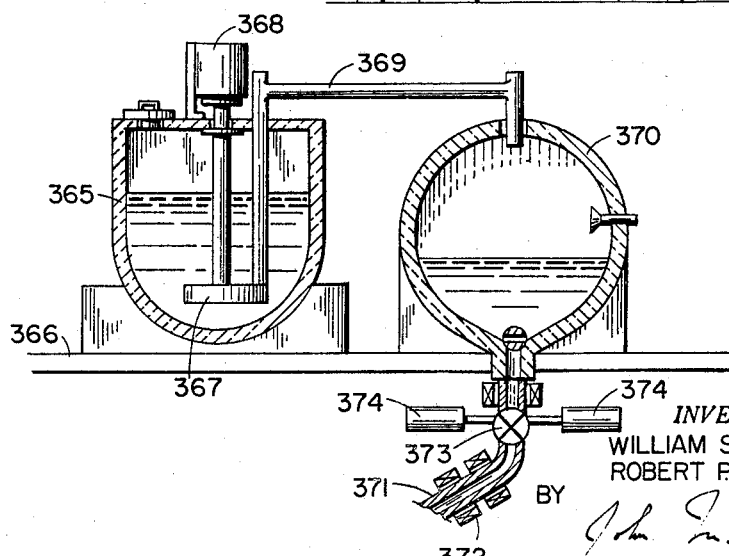

United States Patent Office 3,481,389
Patented Dec. 2, 1969

3,481,389
METHOD OF MELTING AND CASTING FOAM METAL
William S. Fiedler, Racine, and Robert P. Annen, Madison, Wis., assignors to LOR Corporation, Enid, Okla., a corporation of Oklahoma
Application Feb. 21, 1966, Ser. No. 534,605, now Patent No. 3,382,914, dated May 14, 1968, which is a continuation of application Ser. No. 407,269, Sept. 17, 1964, which in turn is a continuation of application Ser. No. 134,791, May 8, 1961. Divided and this application Apr. 10, 1968, Ser. No. 720,121
Int. Cl. B22d 27/18, 9/00
U.S. Cl. 164—55                                                                 4 Claims

ABSTRACT OF THE DISCLOSURE

Methods for providing metal foam casting comprise introducing a foamable metal mixture between oppositely disposed side plate members and pressing the side plate members together against interposed members, to provide a mold. At least one of the side plate members is preferably pre-heated and at least one is preferably quenched. Mixing a molten metal and foaming agent to provide a foamable metal mixture may be accomplished by introducing each of the two components to the inlet of a pump.

CROSS-REFERENCES

This application is a division of application Ser. No. 534,605, filed Feb. 21, 1966, which application is a continuation of application Ser. No. 407,269, filed Sept. 17, 1964, now abandoned, which application is a continuation of application Ser. No. 134,791, filed May 8, 1961, now abandoned, all having the same title.

FIELD

This invention relates to means and methods for manufacturing foam metal, and more particularly relates to foundry equipment and practice wherein metered weights of molten foamable metal are intermittently cast into reusable molds.

PRIOR ART AND SUMMARY

Foam metal as used herein is understood to mean material as described in U.S. Patent 2,751,289 issued June 19, 1956, to John C. Elliott.

Heretofore, it has been known to pour molten metal from a converter into a series of molds. However, in such foundry practice metal is poured into a mold from the converter until the mold is filled to overflowing, whereupon the pouring is stopped and pouring into the next mold is commenced. In foam metal practice, it is necessary to charge a metered weight of molten metal into a mold in a manner which enables the charge in to the mold to expand as the foaming reaction progresses. The product that is obtained is a casting of predetermined density and weight. The product which would be obtained if the mold were substantially filled with foamable metal would be one of variable density and weight with the major proportion of the charge being wasted as foam which overflows the mold. Thus, it is necessary that the charge be metered before being introduced into the mold.

OBJECTS

It is an object of this invention to provide a means and method for casting foamable metal.

It is another object of this invention to provide equipment and procedures for continuously operating a foundry wherein charges of foamable metal are metered before being poured into the mold.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

DRAWINGS

FIGURE 6 is another schematic floor plan for a foam metal foundry;

FIGURE 7 is a schematic elevation of a portion of the embodiment shown in FIGURE 6;

FIGURE 9 is an elevation of means for mixing decomposable material with molten metal;

FIGURE 10 is an elevation of another embodiment of this invention; and

FIGURE 11 is an elevation of another embodiment of this invention.

DESCRIPTION

Figure 1:
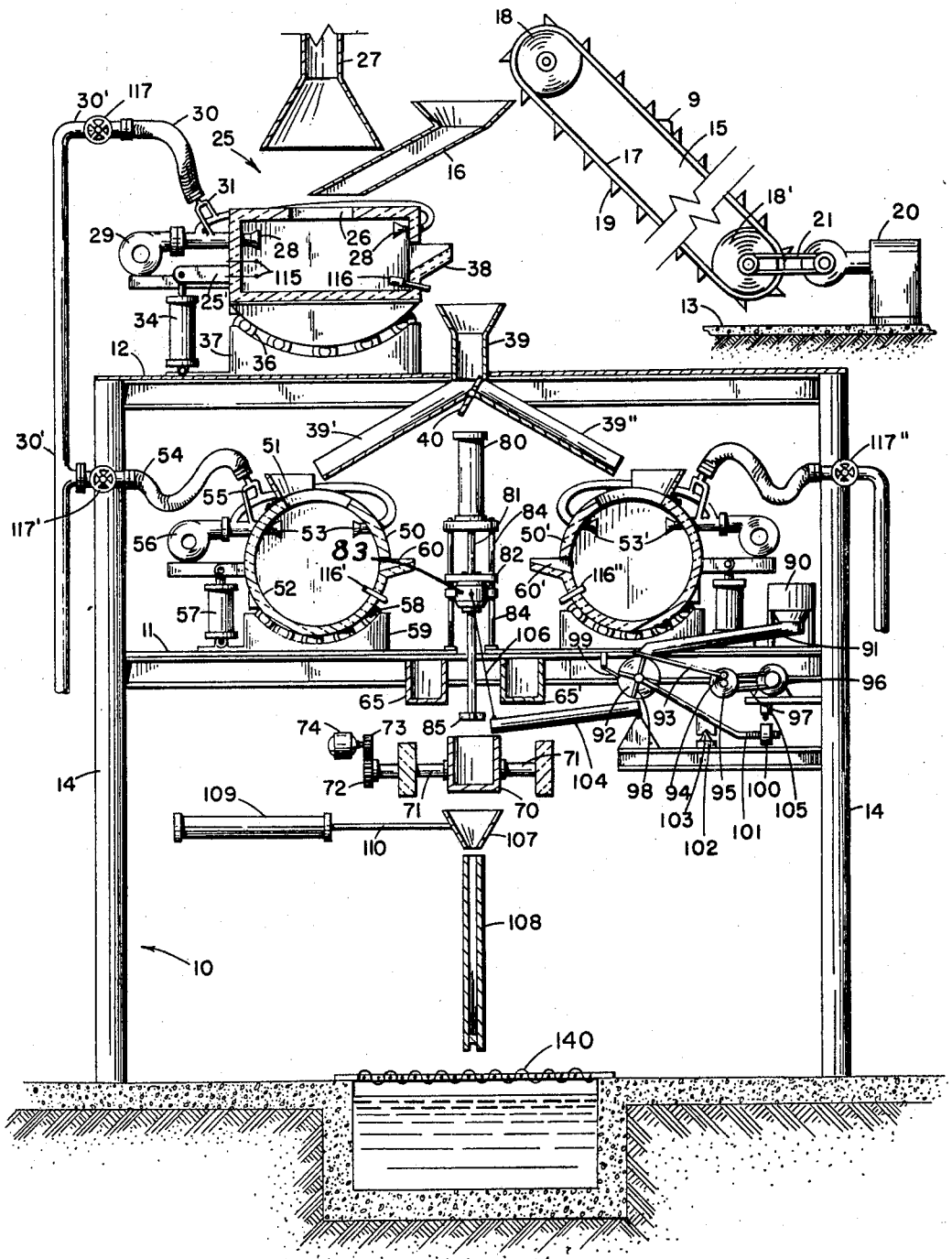
FIGURE 1 is a schematic perspective view of one embodiment of the invention for melting, metering and casting foamable metal into molds.

In FIGURE 1 structure 10 is shown comprised of two floors 11 and 12, and columns 14 of reinforced concrete construction. Conveyor 15 extends from ground levels 13 to a position above structure 10 and supplies metal pigs 9 or other metal stock to melting furnace 25 by means of chute 16 as shown. Conveyor 15 comprises belt 17, pulleys 18 and 18' and cleats 19 on belt 17. Motor and speed reduction apparatus 20 are operably connected to drive pulley 18' of conveyor 15 by means of drive belt 21 in conventional manner. Metal stock drops from conveyor 15 into chute 16 through which it is conveyed into melting furnace 25. Melting furnace 25 is provided with an opening 26 in the top thereof through which pig 9 drops and through which hot gases escape into stack 27 as shown. Blower 29 introduces air mixed with combustible gas from lines 30 and 30' and mixing valve 31 to burners 28 in operable manner. Metal stock in melting furnace 25 is melted by the heat from gas burners 28, and molten metal accumulates in the bottom of furnace 25 where it may be discharged by actuation of hydraulic cylinder 34. Hydraulic cylinder 34 is anchored to floor 12 of structure 10 and is connected to member 25' on furnace 25 thereby providing means for tilting furnace 25 on roller 36. Rollers 36 are rotatively mounted on base member 37. Molten metal in furnace 25 is discharged through spout 38 into chute 39.

Chute 39 passes through floor 12 of structure 10 and divides into branch chutes 39' and 39". Metal in chute 39 can pass through either chute 39' or chute 39" by deflector plate 40 being operably positioned in right position or left position as may be desired. Molten metal flows by gravity from chute 39' into holding furnace 50. Deflector plate 51 is provided to prevent molten metal from chute 39' from overshooting and running over holding furnace 50. The interior cavity of holding furnace 50 may be lined with fire brick 52 and is provided with gas burners 53 as shown. Combustible gas is provided in line 30' and flows through flexible tube 54 into mixing valve 55 where it is mixed with air provided by blower 56. Burners 53 are provided within holding furnace 50 for maintaining the charge of metal therein in molten state. Hydraulic cylinder 57 is operably affixed to holding furnace 50 and to floor 11 of structure 10 in operable manner so that when actuated, holding furnace 50 is rotated upon rollers 58. Rollers 58 are rotatively mounted in base member 59. When holding furnace 50 is so rotated, discharge spout 60 is disposed below the level of the molten metal within holding furnace 50 and the metal is discharged therefrom by gravity flow into metering pot 65. In similar manner, when deflector plate 50 within chute 39 is disposed in left-hand position in FIGURE 1, molten metal will flow through chute 39″ into holding furnace 50. Molten metal in holding furnace 50′ can be maintained at any desired temperature by means of automatic temperature control of burners 53′ until discharged from spout 60′ into metering pot 65′.

Metering pots 65 and 65′ may be rotated about horizontal axes in a clockwise and counter-clockwise direction respectively, as shown, to pour molten foamable metal therefrom into mixing pot 70. Mixing pot 70 is preferably a fire-brick lined vessel which is supported on trunnions 71. Drive gear 72 is affixed to trunnion 71 and is meshed with pinion gear 73. Pinion gear 73 is fixedly attached to the drive shaft of motor 74. When motor 74 is actuated, mixing pot 70 is operably tilted and the contents of the pot are discharged by gravity flow.

Hydraulic cylinder 80 is provided with piston member 81 to which movable frame 82 is attached. Mixing device 83 is operably affixed to frame 82 and can be operably raised and lowered with frame 82 by means of vertical track 84. Thus, beater 85 can be lowered into mixing pot 70 in operable manner to intimately mix the contents of the pot. When mixing pot 70 is inverted by motor 74 being actuated, hydraulic cylinder 80 is actuated and mixer 83 is raised to the level shown to clear mixing pot 70 during rotation thereof.

Hopper 90, shown disposed on floor 11 of structure 10, contains a quantity of granulated solid decomposable material such as metal hydride, metal carbonate or other decomposable material. The contents of hopper 90 flow by gravity through chute 91 to metering device 92. Slide valve 93 provided at the lower end of chute 91 controls discharge of material from chute 91, and is pivotally affixed to eccentrically disposed pin 94 on rotating member 95. Member 95 is operably rotated by means of motor 96 and connecting belt 97, thereby intermittently opening and closing valve 93. When valve 93 is open granulated material from hopper 90 is discharged from chute 91 into metering device 92. Metering device 92 is a conventional weighing device and comprises a plurality of compartments separated by radial dividers 98 as shown. Stop member 99 is disposed in contacting adjacency with a divider 98 when the divider is disposed at an angle of less than 45° to horizontal as shown. Thus, when sufficient granulated material from chute 91 is discharged into compartmented metering device 92 between two dividers 98 to overbalance counterweight 100 on lever 101, the end of the device drops downward by lever 101 being rotated about fulcrum member 102 and knife edge 103 until divider 98 is clear of stop member 99. Metering device 92 is then rotated by the center of gravity of the charge of material in the device being laterally offset from the axis of metering device 92 as shown. The material within metering device 92 is operably discharged by gravity into chute 104, whereup metering device 92 is again elevated by action of counterweight 100 so that stop member 99 is again interposed in the path of rotation of a divider 98. Electric switch button 105 is provided over member 100 so that motor 96 is shut off when member 100 is lowered out of contact therewith. Chute 104 is operably raised and lowered by means of chain 106 affixed to movable frame 82 as shown. When frame 82 is lowered, by actuation of cylinder 80, thereby lowering beater 85 into mixing pot 70, chute 104 is lowered and a metered charge of material from hopper 90 flows by gravity into mixing pot 70 where it is intimately mixed wth a metered charge of molten meal to provide a foamable metal mixture within the mixing pot. Beater 85 is operated within mixing pot 70 for only a short period of time before it is raised into the position shown in FIGURE 1, and mixing pot 70 is inverted by actuation of motor 74 so as to pour the contents thereof through funnel 107 into mold 108.

Funnel 107 is operably mounted by means of hydraulic cylinder 109 and piston rod 110 can be displaced from adjacency to mold 108 when mold 108 is transferred between stations.

In the apparatus of FIGURE 1, it is desirable to provide automatic control for several of the components shown. Operation of conveyor 15 is preferably controlled automatically by liquid level sensing element 115 in melting furnace 25 being actuated by the level of molten metal within the furnace receding below a predetermined level. Element 115 may comprise, for example, two electrical contacts 115 between which molten metal within the furnace forms a conductive path. Other operable liquid level control means such as float control means or the like may also be used. Automatic temperature control means are desirably provided in melting furnace 25 and in holding furnace 50 and 50′ since it is nearly essential that molten metal be at a temperature only slightly above the solidus temperature thereof at the time that it is poured into mold 108 to enable it to solidify quickly within the mold to provide foam metal of uniform density. Electrical resistance thermometer 116 is provided in holding furnace 25 as the sensing element for a temperature controller, not shown. Thermometer 116 may be connected through the controller to operably actuate valve 117 in gas line 30. Resistance thermometers 116′ and 116″ in holding furnaces 50 and 50′ respectively, may similarly be wired through automatic controller means to actuate valves 117′ and 117″ respectively. Alternatively, thermo-couples or other temperature-sensing elements may be used in place of resistance thermometers 116, 116′ and 116″. Automatic metering and dispensing of metal from furnaces 50 and 50′ is provided wherein the weight of metal introduced into metering pot 65 controls actuation of hydraulic cylinder 57 which rotates holding furnace 50 and causes molten metal to be poured therefrom into the metering pot. A predetermined weight of metal must be poured into pot 65 before cylinder 57 is actuated to right furnace 50. A similar mechanism is provided on pot 65′ and furnace 50′. The mechanism is further described below in relation to FIGURE 2.

As shown in FIGURE 1, chain 106 is connected to frame 82 at one end and to chute 104 at the other so that the chute can be simultaneously raised and lowered with frame 82. Thus, when a charge of molten metal is introduced into mixing pot 70, beater 85 is automatically lowered thereinto thereby lowering chute 104 so that decomposable material is simultaneously introduced into mixing pot 70 from metering device 92. Cylinder 80 is then actuated to raise beater 85 from mixing pot 70 after a predetermined time lapse and enables pot 70 to be dumped. The relays and circuitry for interconnecting cylinder 80 and metering device 92 with pots 65 and 65′ to provide for automatic operation of the foundry apparatus is within the ordinary skill of an electrician or other person skilled in the art and is not further detailed here.

Figure 2:
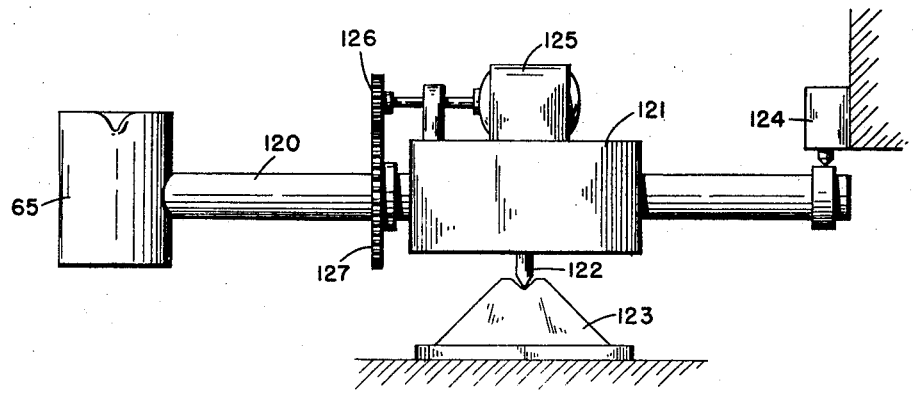
FIGURE 2 is a schematic illustration of a device for metering molten metal.

In FIGURE 2 is shown a schematic elevation of a metering device of this invention. Pot 65 is fixedly attached to rotatable arm 120. The end extremity of arm 120 opposite that to which pot 65 is attached is disposed adjacent load-cell 124. The load cell is operably actuated by the force exerted thereagainst by arm 120 so that molten metal in pot 65, exerts a force downward on arm 120 against knife edge 122 and fulcrum base member 123, with a reacting force being exerted upward against load-cell member 124 in operable manner. When the reaction force on load-cell 124 reaches a predetermined value corresponding to a desired weight of metered molten metal in pot 65, an electrical relay in the load-cell is actuated and reverses the flow of fluid to cylinder 57 (FIGURE 1) thereby tilting the furnace upright to stop pouring molten metal into pot 65. Motor 125, actuated simultaneously with cylinder 57 is mounted on saddle member 121 independent of arm 120. Pinion gear 126, affixed to the shaft of motor 125, meshes with gear 127 on rotatable arm 120, thereby enabling arm 120 to be rotated and pot 65 to be dumped. Arm 120 is then counter-rotated by motor 125 and mechanical strain recorded in load-cell 124 is zeroized at an automatic controller. Molten metal can again be introduced into pot 65 in the manner heretofore described and the cycle is then completed. Overriding manual control may be provided in any of the embodiments of this invention, if desired.

Figure 3:
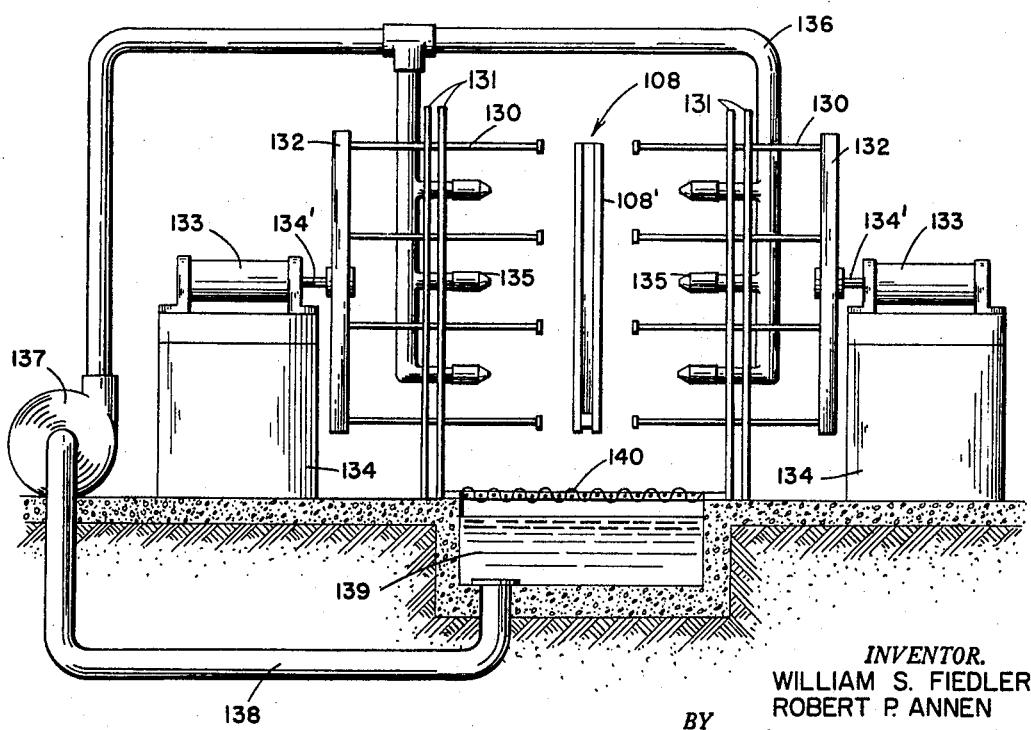
FIGURE 3 is a schematic elevation of means for clamping a mold.

In FIGURE 3 is shown apparatus for supporting mold panels 108' of mold 108 while molten metal is poured into the mold between the panels, and for operably cooling the mold to solidify the metal casting therein. Mold 108 is shown in substantially the same position as shown in FIGURE 1. Hydraulically operated rams 130 are fixedly attached to plate 132 and extend through double-walled heat shields 131. The end extremities of rams 130 are aligned in a vertical plane and contact vertical mold panels 108' and operably support the panels against lateral forces arising from metal expanding within the mold. Hydraulic cylinder 133 is provided with piston rod 134' operably affixed to plate 132 so that rams 130 are enabled to be extended and withdrawn from contact with mold panels 108'. Cylinder 133 is stationarily mounted on support member 134. Nozzles 135 are disposed in juxtaposition with rams 130 and are connected to common manifold 136 which is attached to the output opening of pump 137. Pump 137 draws water through pipe 138 from sump 139 beneath mold 108 and water is sprayed from nozzles 135 against panels 108' of mold 108 to cool the panels and thereby cool and solidify the casting within the mold. Water runs into sump 139 where it is pumped and circulated again to nozzles 135. When mold 108 is sufficiently cooled, hydraulic cylinder 133 is actuated and rams 130 are retracted from contacting adjacency to the mold, thereby enabling mold 108 to be removed from the pouring station. It will be understood that if the mold of a configuration different than two vertical panels is used that fingers 130 may be operably arranged to support the mold against distortion from forces created by foaming of molten metal within the mold. As shown, screen 140 is provided in sump 139 to prevent metal flashings from falling into sump 139.

Figure 4:
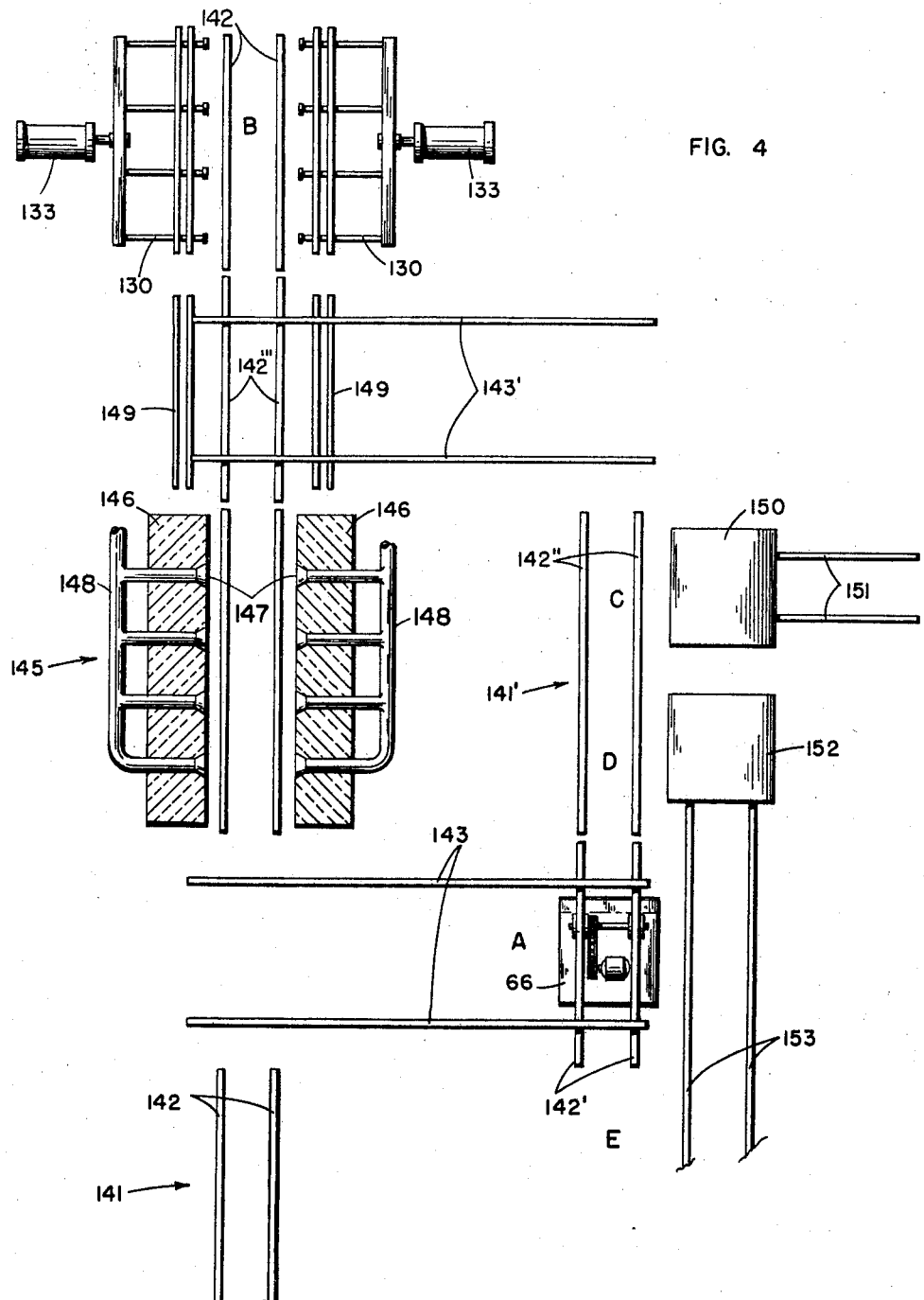
FIGURE 4 is a schematic floor plan for a foam metal foundry.

In FIGURE 4 is shown a schematic plan view of a layout of the foundry of this invention. A mold, such as mold 108 of FIGURES 1 and 3 can be suspended from overhead conveyor means 141 comprised of dual tracks 142. Movable sections of conveyor 141 are provided at transfer stations and can be switched from one system of monorail tracks to another. Thus, rails 142' may be switched between tracks 142 and 142" by means of transfer rails 143. Rails 142''' can be similarly switched by means of transfer rails 143'. The rails and switching means are conventional and comprise no part of this invention. Means for controlling movement of car 66 and prime moving means for such cars may be provided as desired. In a preferred embodiment, electric motors are provided on each car 66 and bus bars are provided along monorails 141 to enable the car motor to be actuated at any position along the rails by remote electrical control means. The motors are operably connected to drive frictional contact wheels which ride on the rails thereby to operably provide motive power for the cars.

Beginning at Station A in FIGURE 4, tracks 142' are transferred from alignment with tracks 141' into alignment with tracks 141 by being moved on tracks 143. Car 66 is moved along tracks 142' into pre-heat furnace 145. Pre-heat furnace 145 comprises insulating walls 146 in which burners 147 are operably disposed to heat a mold placed within the furnace. Manifolds 148 operably convey a combustible gas-air mixture to burners 147. It is preferred to provide a thermostatic element such as a bi-metal strip or a thermo-couple to control flow of gas to burners 147, the temperature sensing element being placed in conjunction with the mold in the furnace and being connected in operable manner to an automatic controller to control heating of the mold. Car 66 may then be moved from pre-heat furnace 145 onto tracks 142'''. Tracks 142''' and double walled heat reflector shields 149 comprise an integral unit which may be moved laterally on transfer tracks 143'. The provision of shields 149 prevents excessive loss of heat from a pre-heated mold by radiation to the surroundings. Car 66 is then moved along tracks 142''' into position for receiving a pour of foamable metal at Station B. At Station B rams 130 retain the mold in fixed position as above described in relation to FIGURE 3. After a quantity of metal has been cast into the mold while the mold is retained in position by rams 130, the mold is quenched as heretofore described and is run back onto tracks 142'''. Tracks 142''' and heat deflector shields 149 are brought into line with tracks 142'' of conveyor 141'. Car 66 carrying the mold is then transferred on conveyor 141' to Station C, where one of mold panels 108' (FIGURE 3) is removed from the mold. Cart 150 operates on floor tracks 151, and mounts apparatus for removing panel 108' from mold 108 (FIGURE 3). Car 66 is then transferred along conveyor 141' to Station D. Cart 152 is provided with apparatus similar to that of cart 150 and the foam metal casting is operably removed from the mold by means described below. Cart 152 is then operably moved along rails 153 to Station E where the casting may be transferred to other material handling means as may be desired. Car 66 is backtracked to Station C and mold panel 108' is replaced on the mold. Tracks 142' in the meantime have been transferred from alignment with conveyor 141 into alignment with conveyor 141'. Car 66 is moved along conveyor 141' to Station A, thereby completing the cycle.

The described operation can be altered in numerous ways as will be apparent to one skilled in the art, and it is within the scope of this invention to provide mechanical means which enable a re-usable mold to be operably positioned to receive a charge of foamable metal and be transferred to a remote location to open the mold, remove the casting from the mold and re-assemble the mold for repeated use.

Figure 5:
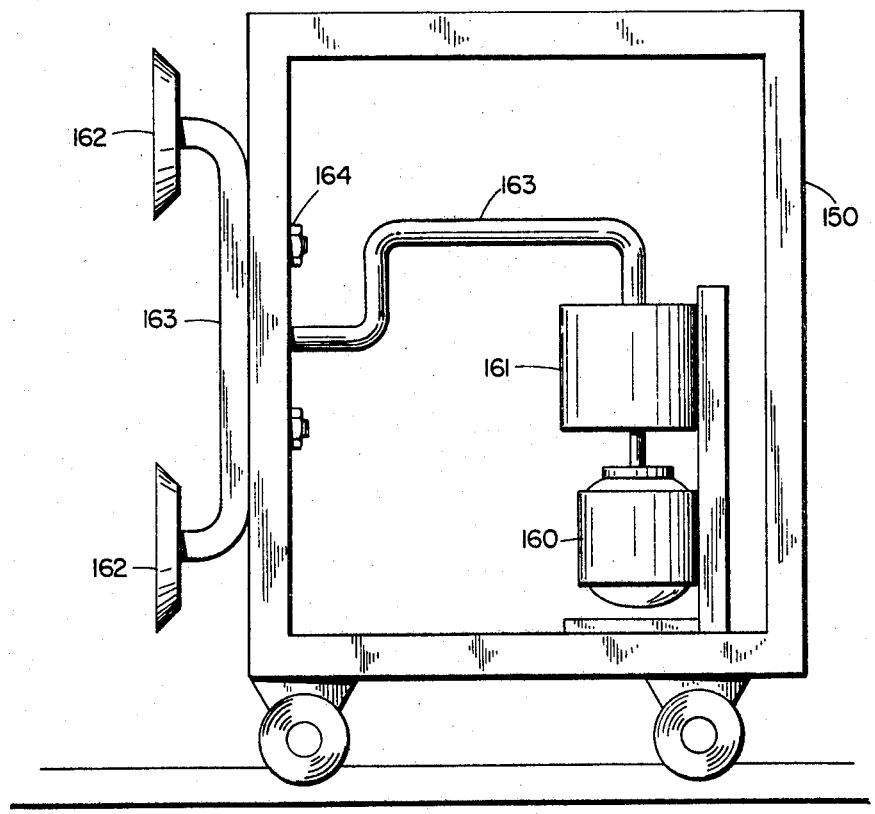
FIGURE 5 is a schematic elevation of apparatus for removing a foam metal casting from a mold.

In FIGURE 5 is shown one embodiment of the device which may be used on carts 150 and 152 of FIGURE 4 for removing a mold panel and for removing a casting from a mold. Motor 160 is coupled to vacuum pump 161 and the two units are operably mounted on cart 150. Vacuum pump 161 is connected to vacuum pads 162 to evacuate the pads in operable manner. A partial vacuum of a few pounds, is sufficient for lifting and transporting flat-surfaced objects and any conventional vacuum lifting means or other material handling means may be used. Vacuum manifold 163 is affixed to support members 164 on cart 150. A mold panel or the casting within the mold may be operably contacted by moving cart 150 into near adjacency therewith to contact the mold or the casting with the vacuum pads, then evacuating the pads and removing the cart away from the mold. To replace mold panel 108' on mold 100 (FIGURE 3) cart 150 is again wheeled adjacent the mold and panel 108' is operably released from vacuum pad 162. Similarly, cart 152 can be moved to another part of the plant and the casting supported on vacuum pads 162 may be released as desired. It will be understood that means other than the device described in FIGURE 5 may be employed for removing panels and castings from molds, the particular means comprising no part of this invention.

In FIGURES 6 and 7 is shown car 166 operated by electric motor means to which electricity is conducted by bus bar 165'. The motor means is operably connected to rotate friction drive wheel 167 to drive the wheel along monorail 165, thereby providing operable motive power for car 166. Car 166 is supported from rail 165 by means of wheels 168 bearing upon lower flange 165'' of rail 165. Any other operable arrangement may be provided as may be desired. Car 166 is provided with heat-deflector shield 169 thereunder to protect it from heat radiated from the pre-heat furnace and from hot metal cast into the mold. Car 166 is provided with two rigid depending guide members 170, and with cable 171. Cable 171 is operably wound and unwound on winch means in car 166. The ends of cable 171 are connected to mold hangers 172, which are shown in FIGURE 7 immersed in salt bath 173. Cables 171, upon being wound by means within car 166, raise mold hangers 172 into rigid adjacency to guide members 170. Means for actuating winch means within car 166 may be electrically controlled by an operator remote from car 166 or may be controlled by contact means such as stop 174 disposed in near adjacency to monorail 165. Other conventional means may also be used. Mold 172' upon being immersed in molten salt bath 173 for a predetermined time is elevated to a desired temperature whereupon cables 171 are wound up to raise mold hangers 172 into adjacency with guide members 170. Salt bath 173 is maintained at a constant temperature by pump means 175 and motor 176 which operate to circulate molten salt through inlet pipe 177 and outlet pipe 178 connected to pump 175. Burners 180 are disposed adjacent to outlet pipe 178 and molten salt within pipe 178 is radiantly heated thereby to thereby increase the temperature of salt bath 173 in operable manner. A salt bath temperature control element may be used to automatically control operation of burners 180.

Car 166 travels along rail 165 carrying pre-heated mold 172 into position between clamping means 182 and is prepared for receiving a charge of molten foamable metal by motors 183 being actuated, thereby operably rotating flexible cable 180, which in turn rotates turn buckle 185. Turn buckle 185 operably causes mold clamps 182 to contact the sides of the mold and provides support therefor during filling of the mold with molten foamable metal. Motors 183 are preferably automatically controlled by limit switches on turn buckles 185. When mold 172 is disposed between clamping means 182, molten metal may be poured thereinto. The apparatus shown in FIGURE 1 for pouring molten metal may be provided or other operable means may be provided as desired. Mold 172 may be quenched by air jetted from nozzles 186 or by an atomized spray, mist, or fog jetted from said nozzles. Car 166 may then move into adjacency to mold opening device 190, whereupon car 166 is stopped while mold opening device 190 is brought into juxtaposition with a removable mold panel and is operably locked into the mold panel, such as by exhausting vacuum pads 191 or by other operable means, whereupon mold opening device 190 is rotated outwardly past the position shown in FIGURE 1 so as enable the casting within mold 172 to be removed in comparable manner by means of casting removal device 193. Devices 190 and 193 may be operably swung on posts 194 and 195 respectively, by any operable means such as electric motor means, hydraulic cylinder means, pneumatic motor means or other operable means. When casting removal device 193 is rotated into the position shown in FIGURE 7, it is pivoted about pivot 197 by actuating cylinder 194, thereby to place the casting in a horizontal position whereupon the vacuum in vacuum pads 191 may be released and the casting be dropped onto conveyor belt 198 in operable manner. The cycle is completed by mold removal device 190 being again swung into adjacency with the mold and the mold panel being replaced on the mold. Car 166 can then be routed around the monorail 165 to salt bath pre-heating means 173 to complete the cycle.

The embodiment of this invention described in relation to FIGURES 6 and 7 is provided with increased flexibility for plant operation by use of conventional monorail switching means 199 as shown. By providing a closed monorail loop, casting of foam metal panels may be done on a continuous basis with a minimum amount of delay in changing molds within clamping means 182. It is to be understood that the embodiment shown in FIGURE 6 illustrates one means of providing a closed track monorail in practicing foundry casting of molten metal and numerous variations in the equipment will be obvious to one skilled in the art.

Figure 8:
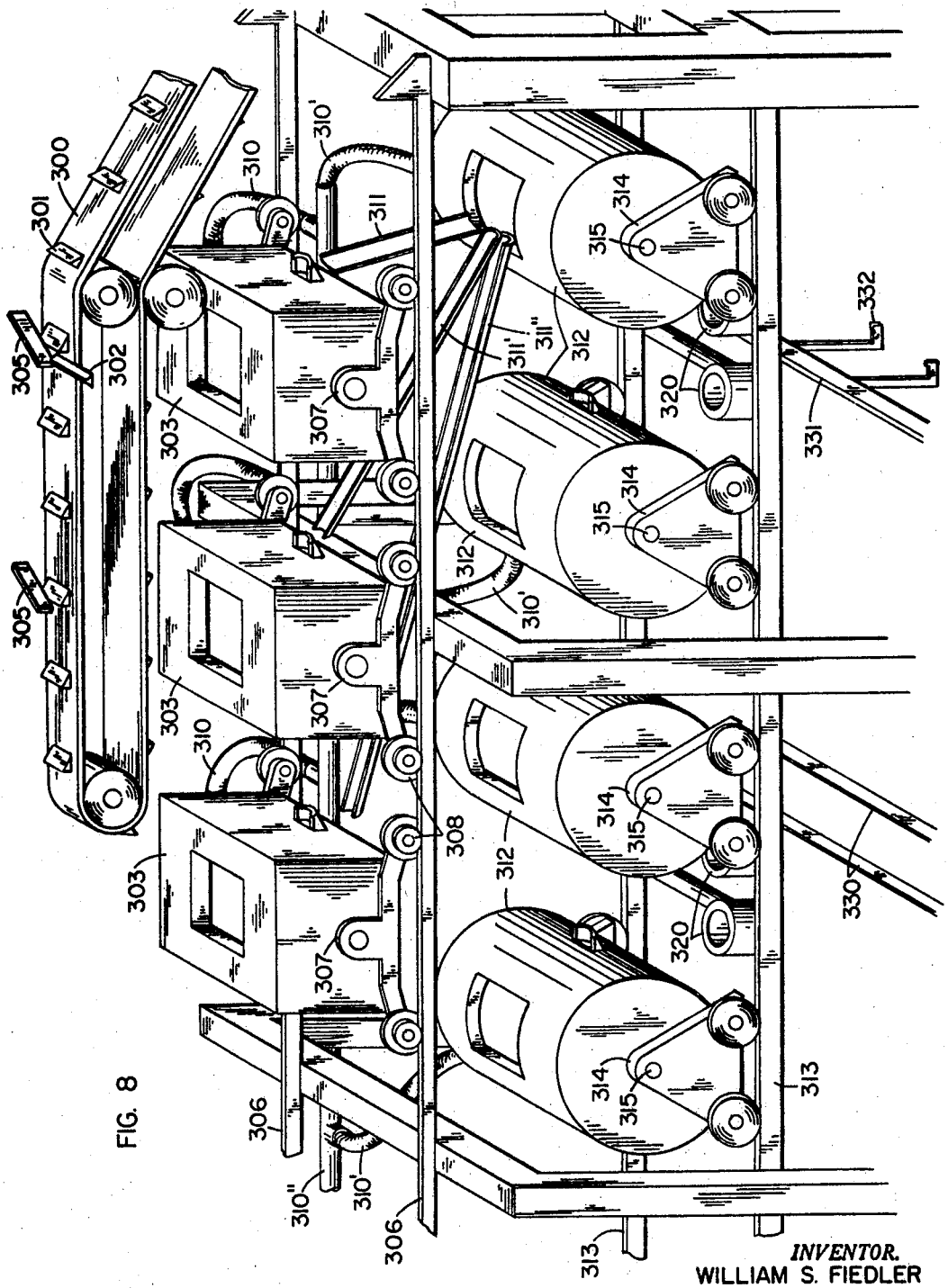
FIGURE 8 is a perspective view of another embodiment of this invention for casting a charge of foamable metal.

In FIGURE 8 is shown another embodiment of the invention wherein conveyor 300 is shown with cleats 301 affixed thereto against which pigs of metal 302 abut while being elevated above melting furnaces 303. Melting furnaces 303 are disposed below a portion of the run of conveyor 300, and movable deflectors 305 are provided along the run to deflect pigs 302 from conveyor 300 to enable them to drop into melting furnaces 303. Melting furnaces 303 are substantially identical to melting furnace 25 of FIGURE 1, except that furnaces 303 are movable on track means 306. Tracks 307 on each melting furnace are provided with wheels 308 which enable the furnaces to be withdrawn from location for services and repair and to be moved into position to pour into any one of several holding furnaces disposed below tracks 306 thereby providing greater flexibility of operation than if the furnaces were stationarily mounted. Flexible gas lines 310 are connected to manifold 311 to provide gas to burners in melting furnaces 303.

Removable chutes 311, 311' and 311'' are provided adjacent melting furnaces 303 as shown for conveying molten metal from a plurality of melting furnaces simultaneously to any holding furnace 312 if rapid charging of the holding furnace should be desired. Holding furnaces 312 are substantially identical to holding furnaces 50 and 50' of FIGURE 1, except that track means 313 are provided upon which holding furnaces 312 can be operably transported by means of wheeled carriage 314. Furnaces 312 pivot about pivot 315 on carriages 314 and may be dumped in a manner identical to holding furnaces 50 and 50' of FIGURE 1. Flexible hoses 310' are shown connected to manifold 311 for conveying gas to burners in holding furnaces 312. Apparatus for operably tilting holding furnaces 312 and the melting furnaces 303 is similar to that shown in FIGURE 1, but is not shown for the sake of convenience. Any of holding furnaces 312 may have molten metal discharged therefrom into any metering pot 320 by being transported along rails 313 until disposed immediately above one of pots 320, whereupon the furnace may be tilted and molten metal discharged by gravity flow therefrom into metering pot 320. Metering pots 320 are similar to metering pots 65 and 65' of FIGURE 1. However, decomposable material such as that contained within hopper 90 of FIGURE 1 is introduced into pots 320 together with means for mixing the contents of the pot such as beater 85 of FIGURE 1. Such means are not shown for the sake of convenience but may be substantially identical to those shown in FIGURE 1, but disposed to operate in conjunction with metering pots 320 rather than a separate mixing pot.

Railway track 330 is run beneath two of pots 320. Railway cars carrying molds may be provided on track 330. Conveyor 331 is shown disposed between the other two pots 320 and is provided with hooks 332 for supporting molds into which the contents of pots 320 can be operably discharged. The selection of conveyance means for transporting molds into operable relation to pots 320 is a matter of choice and comprises no part of this invention.

In FIGURE 9 is shown an embodiment of this invention wherein metering pot 335, similar in construction to metering pots 65 and 65' of FIGURE 1, is shown supported on rotating arm member 336. Stirrer 337 is mounted in inverted position in pot 335 and comprises motor 338 and impeller 339. Decomposable material is introduced from hopper 340 by solenoid 341 being operably actuated when a required weight of metal has been introduced into pot 335, thereby closing slidable valve 342 and opening slidable valve 343. A measured quantity of decomposable material from between valves 342 and 343 operably falls into chute 344 and is conveyed by gravity flow to pot 335. Solenoid 341 may be connected to the electrical relay circuit of the metering device in operable manner as may motor 338 so that motor 337 is actuated simultaneously with solenoids 341, thereby causing the contents of pot 335 to be intimately quickly mixed while beam 336 is being operably rotated as described in relation to FIGURE 2. Stirrer 337 is fixedly attached to pot 335 and is rotated therewith. The provision of stirrer 337 integral with pot 335 operably serves to meter, mix and charge foamable material to a mold.

The apparatus described herein may be constructed of suitable material which withstands the heat and abrasion of molten metal. Thus, furnaces for melting aluminum metal or the like and for holding such metal at a specified temperature may be constructed with steel shells and fire brick lining. Metering pots and mixing pots for receiving molten metal may be similarly constructed. The pots may be heated by auxiliary burners placed adjacent the pots, if desired, to prevent metal in the pots from solidifying. Alternatively, electrically heated furnaces and pots for receiving molten metal may be provided.

In FIGURE 10 is shown another embodiment of the invention wherein pump 350 is immersed in molten aluminum 351 in furnace 352. The pump may be of conventional iron or stainless steel construction, but preferably comprises a refractory pump such as nitride bonded silicon carbide such as manufactured by Wire Equipment Manufacturing Company for pumping molten aluminum. Air motor 353 is provided with a hollow shaft 355 through which decomposable granulated material is conveyed by gravity flow from hopper 354. Molten aluminum is drawn into the pump from beneath through the "eye" of the pump while decomposable material drops through hollow shaft 355 into the "eye" of the pump from above. The granulated material is metered by means of metering valve 356 which may comprise two slide valves integrally connected so that when one is closed the other is open, the volume between the slide valves comprising the volume filled by a metered change of material. The pump operation may be governed by a liquid level controller in furnace 352 such as a conventional ball float controller 357 as shown. When the float drops to a predetermined level motor 353 is shut off, and when the molten metal in the furnace is again raised to a predetermined level the motor may again be switched on by auxiliary switch means. The position of float controller 357 also operably regulates introduction of molten metal to the pump portion of the furnace from a melting zone (not shown for simplicity) by means of a variable height baffle plate 358. Baffle plate 358 may be biased only when motor 353 is not operating, the means for biasing plate 358 being any operable means. The molten metal is metered by the automatic level controller 357 governing operation of motor 353. The charge of molten metal and decomposable substance is intimately mixed by action of the pump impellor, in operable manner, and any residual gas evolved in pump 350 bleeds upward into hollow shaft 355. Hollow shaft 355 may be provided with orifice means so that decomposable material is introduced into the eye of the pump throughout the period of pump operation to provide a uniform charge to mold 359. The placement of pump and discharge line within furnace 352 prevents freezing of the metal where it cannot be easily melted.

The point of introduction of a charge into mold 359 may desirably enable the foamable mixture to flow freely into the mold by gravity and not be compressed or otherwise destroyed while foaming within the mold. Shields 360 may be provided as heat reflectors and to prevent accidental contact of movable equipment, water spray, etc. with furnace 352.

The molds of this invention may be constructed of any operable material, however, it is preferred to provide mold facings of material which is not wetted by molten metal. Such materials include woven fabric or rigid panels of graphite, asbetsos, glass, and ceramic materials. Metal molds may also be used when the mold temperature is within a few degrees of that of the casting. Sheet metal such as copper may be provided for the mold face when backed by integral structural support members which add rigidity to the mold and minimize warpage. Such support members may be heat transfer tubes. Cobalt alloy material is a preferred material for use, such material being an excellent heat transfer solid state medium.

In FIGURE 11 is shown another embodiment of the invention wherein melting furnace 365 is mounted on platform 366. Pump 367 is provided with motor 368 and discharge tube 369. Discharge tube 369 conveys molten metal from furnace 365 into holding furnace 370. Pump 367 may be substantially the same as pump 350 of FIGURE 10. Discharge pipe 371 from holding furnace 30 is heated by heating means 372 disposed therearound. Heating means 372 may be an electrical heating coil such as a resistance coil or may be a high frequency induction coil. Heating means 372 may be a steam coil or other means for maintaining metal in discharge pipe 371 molten. Valve 373 is disposed in pipe 371.

In melting furnace 365 and holding furnace 370 it is desirable to provide inert atmospheres to prevent dross from forming and alloying ingredients such as magnesium from burning out of the molten metal. Carbon dioxide or nitrogen may be introduced into the furnaces if desired although gaseous combustion products from gas heating means within the furnace may be sufficient to provide an inert atmosphere for the metal. The furnaces are preferably enclosed and provided with pressure release valves to enable combustion products to escape to stack means, not shown.

While certain modifications and embodiments of the inventions have been described, it is of course to be understood that there are a great number of variations which will suggest themselves to anyone familiar with the subject matter thereof, and it is to be distinctly understood that this invention should not be limited except by such limitations as are clearly imposed in the appended claims.

We claim:
1. Method for providing a casting of metal foam comprising:
   providing an intimate mixture of a measured quantity of molten metal and a measured quantity of foaming agent,
   providing mold means comprising a first side plate member and a second side plate member,
   preheating at least one of said side plate members,
   disposing said side plate members in opposing relation,
   introducing said mixture between said side plate members,
   waiting until said mixture foams and thereby expands to substantially fill the mold,
   pressing said side plate members against interposed members to provide a mold,
   quenching at least one of said side plate members to aid in solidifying said mixture to provide a casting,
   then dissassembling at least one of said side plate members from said mold, and
   then removing said casting from said mold.

2. The method of claim 1 wherein the step of pressing said side plate members against interposed members to provide a mold precedes the step of waiting until said mixture foams and thereby expands to fill the mold.

3. The method of claim 1 wherein the step of pressing said side plate members against interposed members to provide a mold precedes the step of introducing said mixture between said side plate members and the step of introducing said mixture between said side plate members precedes the step of waiting until said mixture foams and thereby expands to substantially fill the mold.

4. The method of claim 1 wherein the step of introducing said mixture between said side plate members precedes the step of pressing said side plate members against interposed members to provide a mold.

References Cited

UNITED STATES PATENTS

| | | | |
|---|---|---|---|
| 2,553,016 | 5/1951 | Sosnick | 164—79 X |
| 3,005,700 | 10/1961 | Elliot | 164—82 X |

FOREIGN PATENTS 615,147 12/1926 France.

J. SPENCER OVERHOLSER, Primary Examiner

U.S. Cl. X.R.

164—79